March 14, 1950
W. LELGEMANN
2,500,787
FLUID FUEL BURNER APPARATUS FOR
EFFECTING DIFFUSION COMBUSTION
Filed Dec. 15, 1944
4 Sheets-Sheet 1
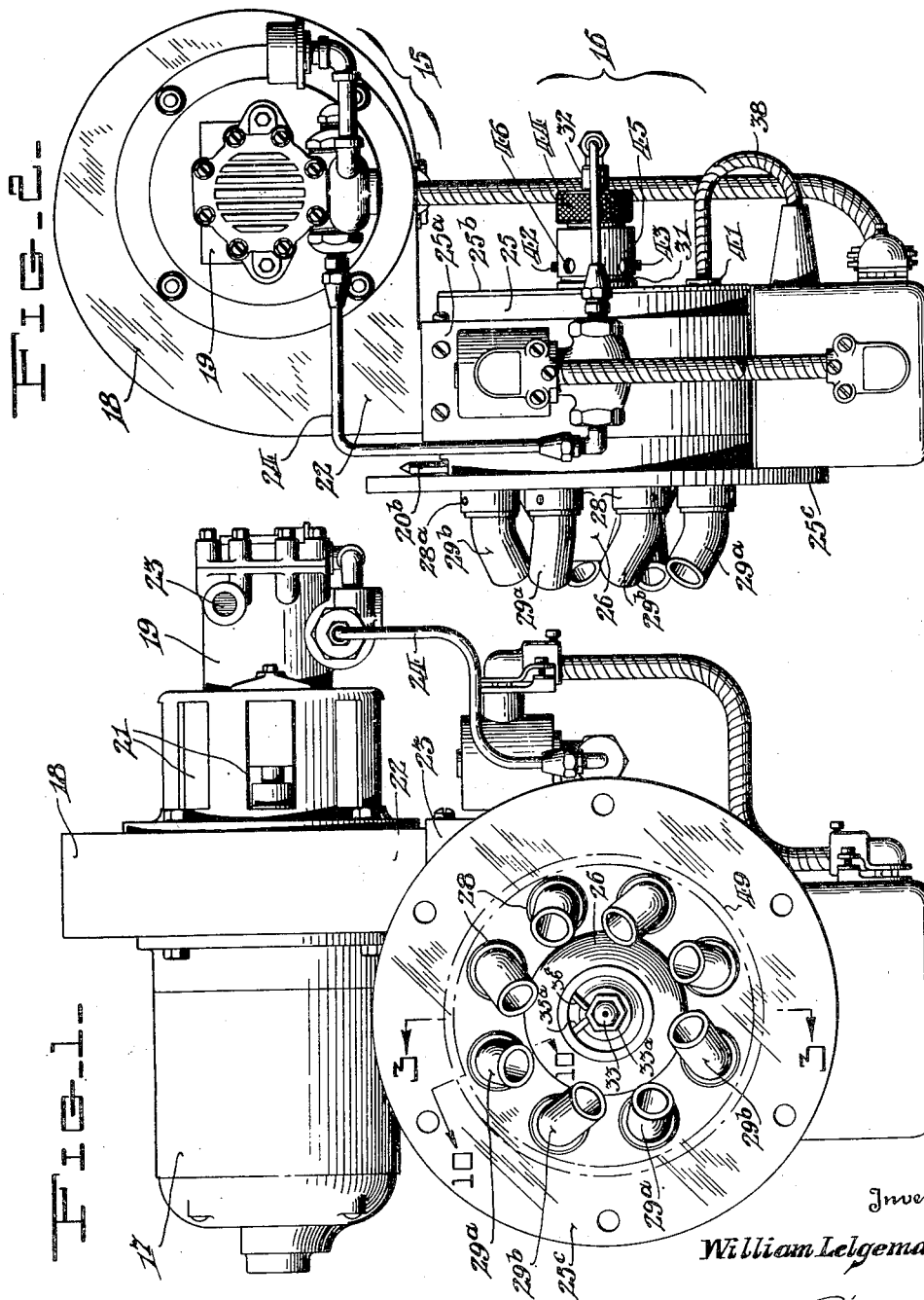
Inventor:
William Lelgemann,
By Alfred E. Ockinger,
Attorney.

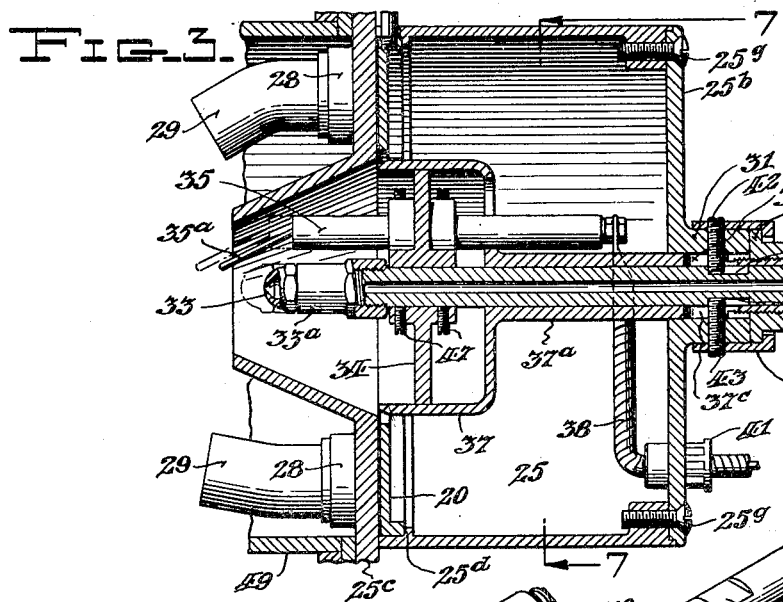

March 14, 1950
W. LELGEMANN
2,500,787
FLUID FUEL BURNER APPARATUS FOR EFFECTING DIFFUSION COMBUSTION
Filed Dec. 15, 1944
4 Sheets-Sheet 3
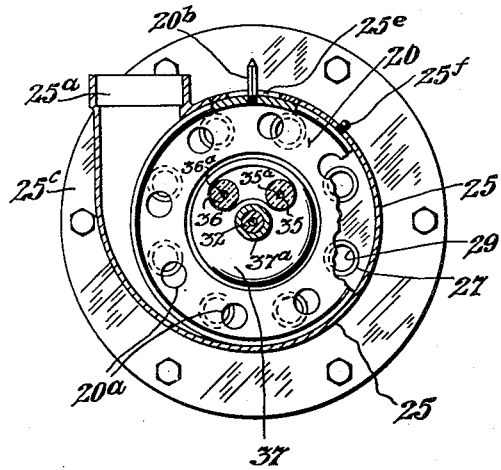
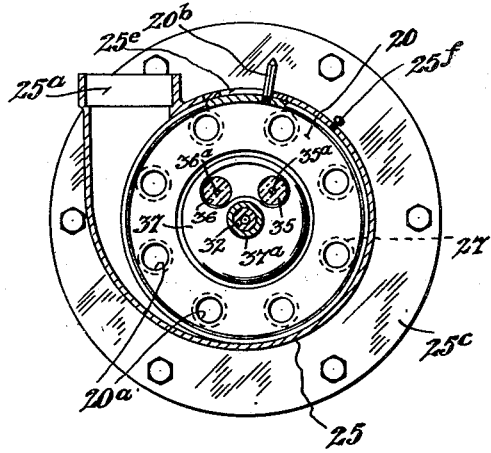
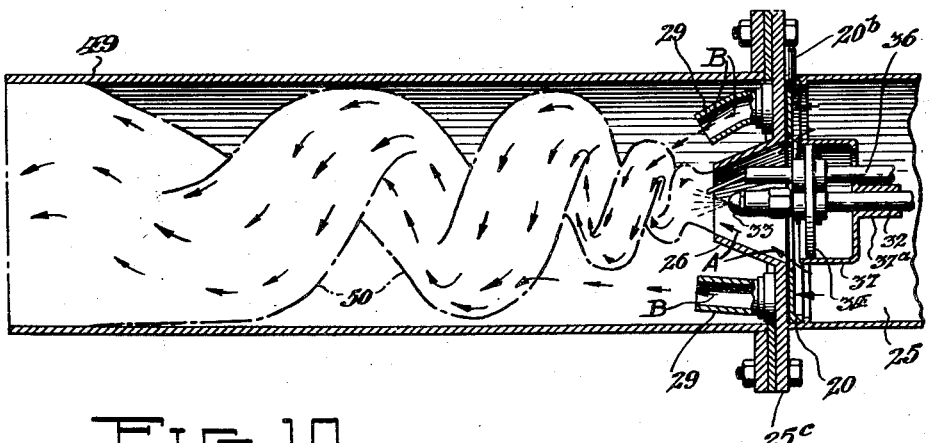
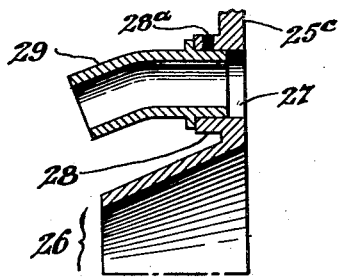
Inventor:
William Lelgemann,
By Alfred E. Eskinger,
Attorney.

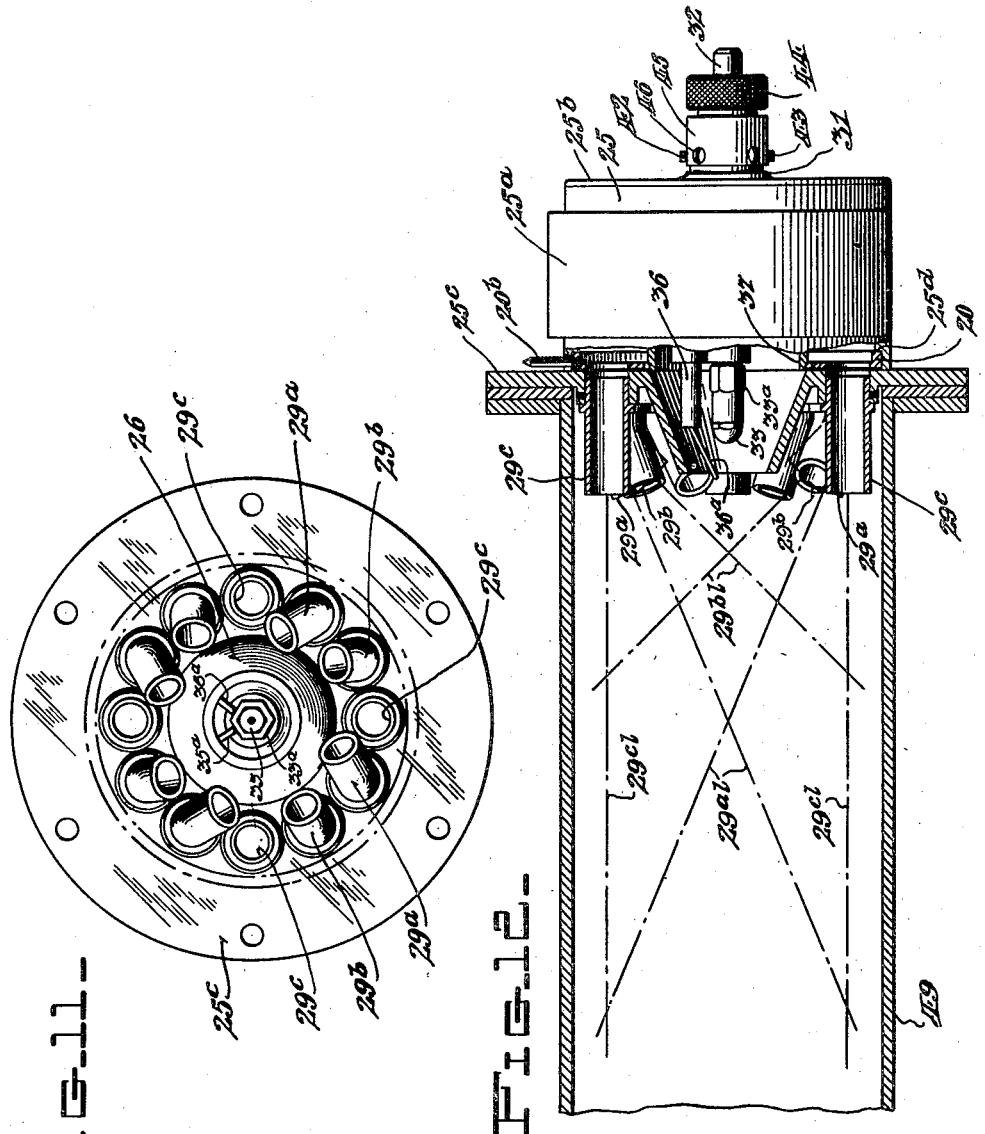

Patented Mar. 14, 1950

2,500,787

UNITED STATES PATENT OFFICE 2,500,787

FLUID FUEL BURNER APPARATUS FOR EFFECTING DIFFUSION COMBUSTION

William Leigemann, Grill, Pa., assignor to Orr & Sembower, Inc., Reading, Pa., a corporation of Pennsylvania Application December 15, 1944, Serial No. 568,350

18 Claims. (Cl. 158—1.5)

This invention relates to a burner apparatus for effecting diffusion combustion of fluid fuels, such as light and heavy oils, gasolene, kerosene, fuel oil No. 1 to No. 6 inclusive, and other heavy fuels such as coal tar oils etc., in atomized, vaporized or gaseous form adapted for diffusion combustion; and to a new method of accomplishing this purpose.

One object of my invention is to provide a novel burner apparatus of the indicated type, which is compact, practical and simple in construction, highly efficient in operation, and which embodies certain structural and functional features of advantage over similar devices of the prior art.

Another object is to provide such a burner apparatus which, in a novel manner, establishes and maintains an extended whirling fuel consuming flame of maximum heat intensity and combustion efficiency.

A further object is to provide such a burner apparatus having unique means for effecting uniform and progressive diffusion and combustion of the fluid fuel fed to the combustion chamber with which the apparatus is cooperatively associated.

An additional object is to provide, in such an apparatus, various structural and functional features which make it possible to attain new and better results in effecting diffusion combustion. For example, the provision of one or more series of separate diffusion medium feeding nozzles of varied angular configuration, which are adapted to be selectively mounted, arranged and adjusted to effect the flow of individual fuel diffusion currents into the combustion chamber in such manner that they will permeate the combustible material therein at selectively determined longitudinal and transverse locations thereof, as best adapted to a particular combustion chamber for bringing about uniform, progressive and complete combustion of the fuel; the provision of a common primary and secondary diffusion medium supply chamber having novel characteristics; and the provision of an adjustable fuel feed nozzle in conjunction with novel means for selectively adjusting the volume and velocity of the primary and secondary diffusion medium.

It is also an object of my invention to provide a novel method of effecting diffusion combustion of fluid fuels in general.

With these and other objects in view, which will become more apparent from the following detailed description of the practical and illustrative embodiment of my novel burner apparatus shown in the accompanying drawings, the invention comprises the novel elements, features of construction, arrangement of parts in cooperative relationship, and new method of effecting diffusion combustion, as more particularly defined by the hereto appended claims.

In the drawings:

Figure 1 is an elevational view of my burner apparatus, and more particularly depicts the side thereof which faces the end of the combustion chamber with which the apparatus is adapted to be cooperatively associated.

Fig. 2 is a side elevational view of the burner apparatus shown in Fig. 1, as seen by looking at the latter from the right.

Fig. 3 is a central cross-sectional view of a certain part of the burner apparatus shown in Fig. 1, taken substantially as indicated by the arrows 3—3 on the latter.

Fig. 4 is a perspective view of a certain unit of the burner apparatus which is partly disclosed in Fig. 3.

Fig. 5 is cross-sectional view similar to Fig. 3, but with certain parts shown in the latter omitted, and certain other parts shown in another position.

Fig. 6 is an enlarged detail cross-sectional view taken substantially as indicated by the arrows 6—6 on Fig. 5.

Fig. 7 is a cross-sectional view, on a reduced scale, taken substantially as indicated by the arrows 7—7 on Fig. 3, with certain parts broken away so as to disclose various structural details.

Fig. 8 is a cross-sectional view, similar to Fig. 7, but with certain parts in another position.

Fig. 9 is a substantially central longitudinal sectional view of certain of the parts of the burner apparatus in cooperative relation with a portion of a combustion chamber, and schematically illustrates a disproportionate approximation of the whirling fuel consuming flame or combustion stream which results when the apparatus is in operation.

Fig. 10 is a detail cross-sectional view, taken substantially as indicated by the arrows 10—10 on Fig. 1.

Fig. 11 is a partial elevational view, similar to Fig. 1, of a modified form of my invention, and Fig. 12 is a longitudinal sectional view, somewhat similar to Fig. 9, but showing the modified structural arrangement of Fig. 11, and schematically indicating by dot-and-dash lines, the general direction of flow of the diffusion medium as determined by the separate interchangeable and adjustable nozzle means forming part of my invention.

The general principles involved in effecting diffusion combustion of fluid fuels are well known, and different types of burner apparatus have heretofore been provided which achieve various degrees of success in converting the potential energy of such fuels into useful heat, depending upon the extent to which they approach maximum efficiency in carrying out these principles. For a more or less extensive exposition of these known principles, which are also involved in the practice of my invention, reference may be had to U. S. Patent No. 2,097,255 issued October 26, 1937, to A. P. Saha.

In the combustion of fluid fuels in gaseous or vaporized form, the characteristics of the flame produced may be controlled by the manner and rate of mixing the fuel with a diffusion medium, such as air, prior to actual combustion, and by the manner and rate of combustion turbulence, or the oxygen concentration with reference to the fuel, during the process of combustion. Much attention has been given the problem of providing a simple and efficient burner apparatus which embodies means for controlling combustion of fluid fuels in this manner, and which is adapted for use with industrial and domestic heating installations. However, I am not aware that a burner apparatus has heretofore been provided which combines (a) a fluid fuel, (b) a primary diffusion medium, and (c) a secondary diffusion medium, in such manner as to produce an extended whirling fuel consuming flame of maximum heat intensity and combustion efficiency, as accomplished by the new method and burner apparatus of my invention.

In accordance with the method and apparatus of my invention, I provide an arrangement capable of establishing and maintaining a continuous elongated or extended whirling fuel consuming flame or combustion stream comprising a regulated mixture of fuel and a primary diffusion medium, into different transverse and longitudinal areas of which stream are continuously forced separate or individual currents of a secondary diffusion medium, thereby to effect uniform progressive diffusion and combustion of the fuel until the latter is practically completely consumed. The direction of flow of the individual currents of secondary diffusion medium is controlled by an arrangement involving one or more series of separate nozzles of varied angular configuration, which nozzles are interchangeably and turnably mounted to permit selective directional adjustment and arrangement thereof as desired. The volume and the velocity of the diffusion medium emanating from said nozzles is subject to simultaneous adjustment. This arrangement not only provides the degree of adjustability necessary to attain the same desirable combustion results with the various combustion chambers with which the burner apparatus is adapted to be cooperatively associated, but additionally lends itself to other desirable purposes. For example, to effect substantially complete combustion of the fuel in suspension, prevent carbon formation on the wall of the combustion chamber, and avoid the necessity of lining the latter with refractory material, certain of the individual currents of the secondary diffusion medium may be directed so as to maintain a diffusion zone or layer of the proper dimensional characteristics directly adjacent to the wall of the combustion chamber.

As will be apparent from the following detailed description, my new method of effecting diffusion combustion of fluid fuels can be carried out by a burner apparatus which substantially comprises the novel structural and functional features of the two practical and illustrative embodiments thereof disclosed in the accompanying drawings.

Considering first the embodiment shown in Figs. 1 to 10 inclusive, and referring more particularly to Figs. 1 and 2, it will be noted that my novel burner apparatus generally comprises a combination fuel and diffusion medium feeding unit 15, and a burner unit 16.

The unit 15 comprises a standard type of electric motor 17, fan housing 18, and fuel pump 19, cooperatively arranged and connected so that the motor will simultaneously operate the pump and drive a fan (not shown) rotatively mounted within the housing 18. Air enters the housing 18 through a series of openings 21, and is discharged from the housing through a tangential outlet passage formed in the outer section of the housing indicated by the numeral 22. The pump 19 is provided with an inlet passage 23 to which may be connected a pipe line from a fuel oil reservoir, and such fuel is then forcibly fed to the burner unit 16 through a feeder pipe 24.

Since various standard forms of fuel and diffusion medium feeding devices can be cooperatively combined with the burner unit 16, it will be understood that the unit 15, as disclosed in the drawings, is merely intended to illustrate and make clear how one practical arrangement of such well known devices may be cooperatively associated with the burner unit 16 to effect the feeding thereto of a fluid fuel such as oil, and a diffusion medium such as air.

The burner unit 16 comprises an annular diffusion medium distributor or housing 25, having a tangential inlet passage 25$^a$, and removably connected substantially flat end walls 25$^b$ and 25$^c$. The wall 25$^c$ is provided with a centrally located hollow truncated member or cone 26 which convergingly extends outwardly beyond the wall, as clearly shown in Fig. 3. Also provided in the wall 25$^c$ are a series of circular apertures 27 which are concentrically arranged in substantially uniformly spaced order adjacent to and about the member 26. Axially aligned with said apertures 27 are a corresponding number of cylindrical wall extensions or flanges 28, adapted to function as mountings for secondary diffusion medium diverters or nozzle devices 29, each of which devices is adapted to be fixedly held in rotatively adjusted position in one of the mountings by suitable means, such as a set screw 28$^a$, as indicated in Fig. 10. A circular valve disk 20 is mounted for limited rotary sliding movement in a grooved portion 25$^d$ provided for this purpose in the inner front section of the annular wall of the housing 25, directly adjacent to its flat end wall 25$^c$. This valve disk 29 is also provided with a series of circular apertures 20$^a$ corresponding in number, size and shape with the apertures 27 in the wall 25$^c$. To facilitate rotation of the valve disk 20 so as to effect movement of the apertures 20$^a$ into and out of registry with the apertures 27, and thereby adjustably regulate the flow of the diffusion medium from the chamber 25 through said apertures 27, a handle 20$^b$ is secured in the edge section of disk 20, which handle extends through a slot 25$^e$ in the housing 25, which slot is of such length that when the handle 20$^b$ is moved from one extreme end thereof to the other, the disk 20 will be rotatively moved from a position as shown in Fig. 8, which brings the apertures 20$^a$ into axial registry with the apertures 27, to a position where the solid wall portions of disk 20 will completely cover the apertures 27. In order that the valve disk 20 may be held or fixed in selectively adjusted positions, a set screw 25ᶠ is provided which is adapted to extend through a threaded aperture in the annular wall of the housing 25 so that its tip can cooperatively engage the edge of disk 20 and lock the latter in any adjusted position.

The end wall 25ᵇ is separately formed and constitutes a circular cover which is removably attached to the housing 25 by screws 25ᵍ. Integrally formed on the outside of end wall or cover 25ᵇ is an annular extension or boss 31, which is adapted to mainly support a unit comprising an oil feed conduit or pipe 32 having a combination fuel spray nozzle 33, and nozzle adapter 33ᵃ, removably secured to its forward end; a disk mounting 34 arranged to adjustably hold two electrode insulators 35 and 36; a valve element 37 having an integral sleeve extension 37ᵃ; and electrodes or conductor wires 35ᵃ and 36ᵃ. The forward ends of the wires 35ᵃ and 36ᵃ are positioned so as to form a spark gap in adjacent cooperative relation with the nozzle 33, and the rear ends thereof are connected with conductors 38 and 39 arranged to pass through suitable insulating outlet couplings 41 extending through apertures provided therefor in the lower section of cover 25ᵇ.

The rear portion of sleeve extension 37ᵃ is provided with two aligned slots 37ᵇ and 37ᶜ, through which are adapted to extend two set screws 42 and 43 in turn threadedly engaged in the boss 31. The tips of screws 42 and 43 are adapted to be moved into engagement with two flat sections 32ᵃ and 32ᵇ, oppositely formed in the rear wall portion of the fuel pipe 32.

The outer end section of sleeve extension 37ᵃ is provided with a threaded portion on which is rotatably mounted an internally threaded annular knurled hand manipulated knob 44, having a flange-like portion 44ᵃ secured for free rotation between the end of boss 31 and the overlapping portion of a retaining collar 45 removably secured in position on the boss 31 by set screws 46, as clearly shown in Fig. 6.

As clearly shown in Fig. 4, the electrode insulators 35 and 36 are adjustably mounted in bosses integrally formed on the disk mounting 34. Set screws 47 are threadedly engaged in apertures extending through a wall portion of each of said bosses in such manner that the tips of the screws engage the electrode insulators 35 and 36 for the purpose of holding them in position. This arrangement permits of selective rotational and axial adjustment of the insulators 35 and 36, and consequently the forward ends of wires 35ᵃ and 36ᵃ so that a spark gap can be formed thereby in selectively determined position relative to the fuel nozzle 33.

The outer or perimetrical edge of the disk mounting 34 has free but snug sliding engagement with the inner annular surface of the wall of the valve element 37, so that the diffusion medium which enters the rear portion of the valve element 37 through the aperture provided in the vertically extending wall thereof for extension therethrough of the insulators 35 and 36, is prevented from escaping into the cone 26.

Individual and selective longitudinal adjustment of the valve element 37, and the fuel nozzle 33 with its associated parts shown in Fig. 4, can be readily effected. By rotating the finger knob 44, the sleeve extension 37ᵃ and consequently the annular valve element or head 37 can be selectively moved in a longitudinal direction toward or away from the cone 26, so as to increase or decrease the flow of the diffusion medium from the distributor or chamber 25 to the conical member 26 in accordance with the extent of the annular opening formed between the front beveled edge of the valve element 37 and its seating surface at the rear inner section of the member 26. Similarly, by loosening the screws 42 and 43, the pipe 32 and consequently the fuel nozzle 33 can be longitudinally moved to a selectively adjusted position relative to the conical member 26, after which the pipe 32 can be secured in said adjusted position by tightening the tips of screws 42 and 43 against the flat portions 32ᵃ and 32ᵇ of pipe 32. In Fig. 3, the extreme forward position of the fuel nozzle 33 is indicated in dot-and-dash lines, and Fig. 5 shows the valve element 37 retracted to its extreme rearward position.

The fuel pipe 32 is provided with an internal threaded socket 48 at its outer end for receiving a suitable coupling adapted to join the pipe 32 with the fuel feed line extending to the pump 19.

The tangential inlet passage 25a of the distributor housing 25 is alignedly connected with the tangential outlet passage 22 of the fan housing 18.

The secondary diffusion medium nozzle devices 29 are provided with front end portions of various angular inclination. For example, the device 29 shown in Fig. 10 has a front end portion which is inclined at an angle of 22½ degrees with respect to the portion thereof which is seated in its mounting 28. By referring to Figs. 1 and 2, it will be noted that two series of nozzle devices having front sections of different angular inclination, are provided in alternating arrangement about the member 26. Those marked 29ᵃ in Figs. 1 and 2 have a front end section inclined at an angle of 22½ degrees, and those marked 29ᵇ have a front end section inclined at an angle of 45 degrees. As shown in Fig. 1, the two sets or series of devices 29ᵃ and 29ᵇ are also arranged to have their front sections laterally turned or positioned as desired so that the individual currents of diffusion medium emanating therefrom will flow to different longitudinal and transverse locations in a combustion chamber, and at the same time collectively create a uniform spiral current or turbulent combustion stream with the primary flow emanating from the member 26. This will become more apparent by reference to Fig. 9 which schematically illustrates the operation of the burner unit 16 when arranged in cooperative relation with the end of a combustion chamber of which only an inside wall section is shown at 49.

In Fig. 9, the general shape of the fuel consuming flame or combustion stream generated by the burner unit 16 is indicated by the dot-and-dash lines 50. However, it is noted that in actual practice, the continuous spiral convolutions of the flame 50 are normally much more closely related, and that otherwise the proportions of the flame are more or less approximately depicted, in order that the general flame structure rather than its actual size and shape may be clearly understood.

As indicated by certain of the short arrows A in Fig. 9, the diffusion medium flows from the distributing chamber 25 through the cone 26, in volume and at a velocity as determined by the adjusted setting of valve element 37. This flow of the diffusion medium constitutes the primary flow which mixes directly with the fuel spray emanating from the nozzle 33, and functions to effect atomization of the fuel at a rate in direct proportion with the selective setting or adjustment of the valve element 37.

As indicated by certain of the other short arrows B in Fig. 9, the diffusion medium also flows from the distributing chamber 25 through the nozzle devices 29, in volume and at a velocity as determined by the adjusted setting of the escape apertures 20ᵃ of the circular valve disk 20. This flow of the diffusion medium constitutes the secondary flow which, in the form of individual currents, mixes with, or permeates the primary flow at different longitudinal and transverse locations thereof, and determines the manner and rate of combustion turbulence, or the oxygen concentration with reference to the fuel. This mixing action is further enhanced by the initial whirling condition of the diffusion medium resulting from its rotational action in the annular distributing chamber 25 after being forced into the latter through the tangential passageway 25ᵃ, by the fan in the housing 18.

Of course, it is to be understood that the unit 15, comprising the fuel and diffusion medium feeding means for the burner unit 16, is to also have combined therewith the usual and well known auxiliary equipment which is ordinarily associated with various types of burner apparatus used in conjunction with industrial and domestic heating installations for effecting diffusion combustion of a fluid fuel. For example, a standard form of automatic control arrangement for automatically and periodically operating the burner apparatus in accordance with the requirements of the particular installation with which it is combined; standard electrical means arranged to effect timing and proper ignition sparking across the gap formed by conductors 35ᵃ and 36ᵃ adjacent the fuel nozzle 33; a fuel strainer, fuel pressure gauge, and other appurtenances of the conventional type required or desired, so that the use of my burner apparatus invention conforms with the usual and well known practice followed in effecting completion of a modern installation of this general type.

The burner apparatus of my invention is adapted for use with industrial and domestic heating installations having combustion chambers of various shapes and sizes. However, it is more particularly designed for use, for example, with hot water and steam generating units of the type manufactured and sold by Orr and Sembower, Inc., of Reading, Pa., which units are provided for laundry and other purposes. Further information concerning these units may be had by referring to the various publications which show and describe the same and are published from time to time for distribution by said company.

The combustion chambers of the hot water and steam generating units manufactured by the said company are of cylindrical configuration and the inside diameter, or cross-sectional area thereof is relatively small. It has been found from actual experience that my burner apparatus attains particularly efficient results in combination with such combustion chambers and that this combination obviates the necessity of lining the inner wall of the combustion chamber with a refractory material. This is attributed to the fact that the burner apparatus functions to effect substantially complete combustion of the fuel while it is in suspension within the chamber. For this reason the inner wall of the combustion chamber also remains free of the usual undesirable carbon formation which is caused by incomplete combustion, etc., and which quickly lowers the amount and rate of the heat transference through the wall of the combustion chamber, and necessitates more or less frequent suspension of the operation of a burner apparatus to permit the performance of cleaning operations.

It is also particularly noted that diffusion of the fuel consuming flame, or combustion stream, as made possible by the arrangement comprising the nozzle devices 29, can be readily extended when considered necessary or desirable, by modifying this arrangement in the manner exemplified by the disclosure of Figs. 11 and 12. Since the modified construction of the burner unit there shown embodies certain elements or parts also included in my burner construction previously described, such parts are designated by the same reference characters to avoid repetition of description.

As clearly shown in Fig. 11, the number of secondary diffusion medium nozzle devices 29 may be increased, so as to include a third set or series of such nozzles marked 29ᶜ, which differ from those designated 29ᵃ and 29ᵇ in Figs. 1, 2, 11 and 12, in that they are straight, i. e., they have no offset or inclined front portion. By increasing the number of nozzles to twelve, as shown, it obviously becomes necessary to correspondingly increase the number of apertures in the wall 25ᶜ and in the circular valve disk 20, as well as similarly increase the number of nozzle mountings 28.

In Fig. 12, the top and bottom straight nozzle devices 29ᶜ have superimposed thereon in dot-and-dash outline, the front angular sections of the devices 29ᵃ and 29ᵇ, in order to make clear the general variation in the direction of flow of the secondary diffusion medium emanating from the three different sets of nozzles. This difference in the direction of flow is indicated in Fig. 12 by the straight dot-and-dash lines marked 29ᵃ¹, 29ᵇ¹ and 29ᶜ¹, which extend to the center of the front edge of the three nozzles depicted in the manner as stated. In this connection attention is directed to the fact that the nozzles 29ᵃ and 29ᵇ are also laterally turned or rotatively adjusted, as in the case of the similar nozzles shown in Figs. 1 and 2. so that the straight dot-and-dash direction indicating lines 29ᵃ¹ and 29ᵇ¹ would not, of course, cross each other at some point located on the longitudinal center line of the cone 26, but would actually extend to one side thereof.

The inclusion of the straight nozzles 29ᶜ in the arrangement disclosed in Figs. 11 and 12 results in directing individual secondary diffusion currents in a straight line along the inner wall of the combustion chamber, and this further increases the effectiveness of the diffusion zone or layer directly adjacent to the inner wall of the combustion chamber.

The nozzle devices 29ᵃ and 29ᵇ shown in Figs. 11 and 12 are like the devices previously described in that their front end sections are inclined at an angle of 22½ degrees and 45 degrees, respectively. However, it is to be understood, that in connection with either or both of the embodiments of my invention illustrated in the drawings, the nozzle devices 29 are adapted to be interchangeably secured in the mountings 28, and may consequently be arranged in any desired order. Furthermore, a different order of arrangement may become desirable, or necessary, for best results, in those instances where the dimensional characteristics of the combustion chamber with which my burner apparatus is combined deviates to a considerable extent from the relative proportions of the one indicated in the drawings.

The expression "fluid fuel" is used throughout the description and claims in the generic sense and refers to a fuel in a flowing condition such as a fuel in liquid, atomized, vaporized, or gaseous state.

From the foregoing, and as more clearly apparent from Figs. 9 and 12 of the drawings, it will be understood that the burner apparatus of my invention is adapted to effect diffusion combustion of a fluid fuel by steps comprising the formation and maintenance of a stream of fluid fuel, automatically igniting the fuel so as to establish a continuous fuel consuming flame or stream, and continuously forcing separate or individual currents of a diffusion medium into different transverse and longitudinal areas of the stream of burning fuel so that combustion continues in uniform and progressive manner as the fuel is diffused by the said currents.

The burner apparatus and method of effecting diffusion combustion of a fluid fuel, as herein specifically disclosed, can, of course, be changed and modified in various ways without departing from the invention more particularly defined by the hereto appended claims.

I claim:

1. A burner apparatus of the character described comprising in combination, a liquid fuel atomizer, and a multiple series of diffusion medium feeding nozzles annularly positioned about said atomizer and arranged in angularly different relation to the longitudinal axis of the atomizer so that each series of nozzles will direct said medium to different transverse locations along the path of travel of the fuel emitted from said atomizer.

2. A burner apparatus of the character described comprising in combination, a liquid fuel atomizer, an air feeding device surrounding said atomizer, a multiple series of air feeding nozzles annularly positioned about said atomizer and arranged in angularly different relation to the longitudinal axis of the atomizer so that each series of nozzles will direct the air discharged therefrom to progressively different transverse locations along the path of travel of the fuel emitted from said atomizer, and a common air supply chamber for the air feeding device and nozzles.

3. A burner apparatus of the character described comprising in combination, a liquid fuel atomizer, an air feeding cone surrounding said atomizer, a multiple series of air feeding nozzles annularly positioned about said atomizer and arranged in angularly different relation to the longitudinal axis of the atomizer so that each series of nozzles will direct the air discharged therefrom to progressively different transverse locations along the path of travel of the fuel emitted from said atomizer, a common air supply chamber for the air feeding cone and nozzles, means for varying the flow of air from said chamber to said cone, and means for simultaneously varying the flow of air from said chamber to said nozzles.

4. A burner apparatus of the character described comprising, means forming an annular air feed chamber having end walls and a tangential air inlet passage, a hollow truncated primary air discharge member arranged to convergingly extend from one end wall section of the chamber, a fuel conduit extending centrally through said chamber and having a fuel discharge nozzle at one end thereof arranged so that it can be selectively positioned relative to the member, said end wall section being provided with secondary air discharge apertures adjacent to the member which apertures are arranged in spaced relation annularly about said member, and means operable to effect relative adjustment of the fuel discharge nozzle and primary air discharge member.

5. A burner apparatus of the character described comprising, means forming an annular air feed chamber having end walls and a tangential air inlet passage, a hollow truncated primary air discharge member arranged to convergingly extend from one end wall section of the chamber, a fuel conduit extending centrally through said chamber and having a fuel discharge nozzle at one end thereof arranged so that it can be selectively positioned relative to the member, said end wall section being provided with secondary air discharge apertures adjacent to the member which apertures are arranged in spaced relation annularly about said member, a valve element within said chamber arranged to be moved relative to the secondary air discharge apertures, and operating means for the valve element located on the outside of the chamber.

6. A burner apparatus of the character described comprising, means forming an annular air feed chamber having end walls and a tangential air inlet passage, a hollow truncated primary air discharge member arranged to convergingly extend from one end wall section of the chamber, a fuel conduit extending centrally through said chamber and having a fuel discharge nozzle at one end thereof arranged so that it can be selectively positioned relative to the member, said end wall section being provided with secondary air discharge apertures adjacent to the member, which apertures are arranged in spaced relation annularly about said member, a circular valve disk rotatively mounted within said chamber and provided with one or more apertures adapted to be moved into and out of registry with the secondary air discharge apertures, and operating means for the disk located on the outside of the chamber.

7. A burner apparatus of the character described comprising, means forming an annular air feed chamber having end walls and a tangential air inlet passage, a hollow truncated primary air discharge member arranged to convergingly extend from one end wall section of the chamber, a fuel conduit extending centrally through said chamber and having a fuel discharge nozzle at one end thereof arranged so that it can be selectively positioned relative to the member, said end wall section being provided with secondary air discharge apertures adjacent to the member which apertures are arranged in spaced relation annularly about said member, and regulating means arranged to determine the extent of air flow from the chamber to the member.

8. A burner apparatus of the character described comprising, means forming an annular air feed chamber having end walls and a tangential air inlet passage, a hollow truncated primary air discharge member arranged to convergingly extend from one end wall section of the chamber, a fuel conduit extending centrally through said chamber and having a fuel discharge nozzle at one end thereof arranged so that it can be selectively positioned relative to the member, said end wall section being provided with secondary air discharge apertures adjacent to the member, which apertures are arranged in spaced relation annularly about said member, and regulating means arranged to determine the extent of air flow from the chamber to the secondary air discharge apertures.

9. A burner apparatus of the character described comprising, means forming an annular air feed chamber having end walls and a tangential air inlet passage, a hollow truncated primary air discharge member arranged to convergingly extend from one end wall section of the chamber, a fuel conduit extending centrally through said chamber and having a fuel discharge nozzle at one end thereof arranged so that it can be selectively positioned relative to the member, said end wall section being provided with secondary air discharge apertures adjacent to the member which apertures are arranged in spaced relation annularly about said member, regulating means arranged to determine the extent of air flow from the chamber to the member, and regulating means arranged to effect selective adjustment of the extent of air flow from the chamber to the secondary air discharge apertures.

10. A burner apparatus of the character described comprising, means forming an annular air feed chamber having end walls and a tangential air inlet passage, a hollow truncated primary air discharge member arranged to convergingly extend from one end wall section of the chamber, a fuel conduit extending centrally through said chamber and having a fuel discharge nozzle at one end thereof arranged so that it can be selectively positioned relative to the member, said end wall section being provided with secondary air discharge apertures adjacent to the member and in concentric relation therewith, fuel igniting means spacedly positioned adjacent the front end of the fuel discharge nozzle, and means arranged to effect united movement of the fuel discharge nozzle and igniting means relative to said member.

11. A burner apparatus of the character described comprising, means forming an annular air feed chamber having end walls and a tangential air inlet passage, a hollow truncated primary air discharge member arranged to convergingly extend from one end wall section of the chamber, a fuel conduit extending centrally through said chamber and having a fuel discharge nozzle at one end thereof arranged so that it can be selectively positioned relative to the member, said end wall section being provided with secondary air discharge apertures adjacent to the member and in concentric relation therewith, means adapted to effect relative adjustment of the fuel discharge nozzle and primary air discharge member, regulating means arranged to determine the extent of air flow from the chamber to the member, and means arranged to effect selective adjustment of the extent of air flow from the chamber to the secondary air discharge apertures.

12. A burner apparatus of the character described comprising, means forming an annular air feed chamber having end walls and a tangential air inlet passage, a hollow truncated primary air discharge member arranged to convergingly extend from one end wall section of the chamber, a fuel pipe extending centrally through said chamber and having a fuel discharge nozzle at one end thereof arranged so that it can be selectively positioned relative to the member, a plurality of separate secondary air discharge nozzles extending from said one end wall adjacent to the member and in concentric relation therewith, a valve device slidably mounted on the fuel pipe and adapted to control the extent of air flow from the chamber to the member, and valve operating means located on the outside of said chamber.

13. A burner apparatus of the character described comprising, means forming an annular air feed chamber having end walls and a tangential air inlet passage, a hollow truncated primary air discharge member arranged to convergingly extend from one end wall section of the chamber, a fuel pipe extending centrally through said chamber and having a fuel discharge nozzle at one end thereof arranged so that it can be selectively positioned relative to the member, a plurality of separate secondary air discharge nozzles extending from said one end wall adjacent to the member and in concentric relation therewith, a valve device slidably mounted on the fuel pipe and adapted to control the extent of air flow from the chamber to the member, means arranged to effect axial adjustment of the fuel pipe, means adapted to lock said fuel pipe in adjusted position, and means operative on the outside of the chamber to effect adjustment of the valve device by sliding action thereof on the fuel pipe while the latter is locked in position.

14. A burner apparatus of the character described comprising, means forming an annular air feed chamber having end walls and a tangential air inlet passage, a hollow truncated primary air discharge member arranged to convergingly extend from one end wall section of the chamber, a fuel pipe extending centrally through said chamber and having a fuel discharge nozzle at one end thereof arranged so that it can be selectively positioned relative to the member, a plurality of separate secondary air discharge nozzles extending from said one end wall adjacent to the member and in concentric relation therewith, a valve device slidably mounted on the fuel pipe and adapted to control the extent of air flow from the chamber to the member, a bearing extension on the outside of the end wall of the chamber opposite to said member in which interfitting portions of the fuel pipe and valve device are adapted to rest, an elongated notch provided in the surface section of the fuel pipe portion positioned within the bearing extension, an elongated slot provided in the wall section of the portion of the valve device positioned within the bearing extension which slot is in registry with said notch, a lock screw threadedly engaged in said bearing extension and having an end portion passing through said slot into cooperative engagement with the surface of the notched portion of the fuel tube, and means rotatably secured to the bearing extension and arranged to effect axial movement of the valve device relative to the fuel pipe while the latter is held in fixed position by the locking screw.

15. A burner apparatus of the character described comprising, means forming an annular air feed chamber having end walls and a tangential air inlet passage, a hollow truncated primary air discharge member arranged to convergingly extend from one end wall section of the chamber, a fuel conduit extending centrally through said chamber and having a fuel discharge nozzle at one end thereof arranged so that it can be selectively positioned relative to the member, a plurality of secondary air discharge nozzles extending from said one end wall adjacent to the member and spacedly arranged in concentric relation therewith, a circular valve disk rotatively mounted within said chamber and provided with apertures corresponding in number with the secondary air discharge nozzles and arranged so that they will move into and out of registry with the latter when the disk is rotatively moved, and means for effecting rotative movement of the disk.

16. A burner apparatus of the character described comprising, means forming an annular air feed chamber having end walls and a tangential air inlet passage, a hollow truncated primary air discharge member arranged to convergingly extend from the center of one end wall section of the chamber, a fuel conduit extending centrally through said chamber and having a fuel discharge nozzle at one end thereof arranged so that it can be selectively positioned relative to the member, a plurality of angular secondary air discharge nozzles extending from said end wall section in juxtaposed concentric relation with said member, separate mounting means for each of said secondary air nozzles arranged to permit angular adjustment thereof relative to the member, and a valve element within the chamber arranged to simultaneously control the volume of air flow from the chamber through said secondary air discharge nozzles.

17. A burner apparatus of the character described comprising, means forming an annular air feed chamber having end walls and a tangential air inlet passage, a hollow truncated primary air discharge member arranged to convergingly extend from the center of one end wall section of the chamber, a fuel conduit extending centrally through said chamber and having a fuel discharge nozzle at one end thereof arranged so that it can be selectively positioned relative to the member, a plurality of series of angularly different secondary air discharge nozzles extending from said end wall section in juxtaposed concentric relation with said member, separate mounting means for each of said secondary air nozzles arranged to permit angular adjustment thereof relative to the member, and a valve element within the chamber arranged to simultaneously control the volume of air flow from the chamber through said secondary air discharge nozzles.

18. A burner apparatus of the character described comprising, means forming an annular air feed chamber having end walls and a tangential air inlet passage, a hollow truncated primary air discharge member arranged to convergingly extend from the center of one end wall section of the chamber, a fuel conduit extending centrally through said chamber and having a fuel discharge nozzle at one end thereof arranged so that it can be selectively positioned relative to the member, a plurality of series of secondary air discharge nozzles extending from said end wall section in angularly different relation with respect to the longitudinal axis of the member and in juxtaposed concentric relation with said member, separate mounting means for each of said secondary air nozzles arranged to permit angular adjustment thereof relative to the longitudinal axis of the member, a circular valve disk rotatively mounted within said chamber and provided with apertures corresponding in number with the secondary air discharge nozzles and arranged so that they will move into and out of registry with the latter when the disk is rotatively moved, means located on the outside of the chamber for effecting rotative adjustment of the disk, and means adapted to lock the disk in adjusted position.

WILLIAM LELGEMANN.

REFERENCES CITED

The following references are of record in the file of this patent:

UNITED STATES PATENTS

| Number | Name | Date |
|---|---|---|
| 329,776 | Robertson et al. | Nov. 3, 1885 |
| 1,023,422 | D'Espujols | Apr. 16, 1912 |
| 1,163,650 | Fogler | Dec. 14, 1915 |
| 1,172,755 | Wilson | Feb. 22, 1916 |
| 1,194,740 | Hunter | Aug. 15, 1916 |
| 1,200,028 | Roberts | Oct. 3, 1916 |
| 1,396,086 | Anthony | Nov. 8, 1921 |
| 1,488,238 | Good | Mar. 25, 1924 |
| 1,603,462 | Hechenbleikner et al. | Oct. 19, 1926 |
| 1,650,342 | Good | Nov. 22, 1927 |
| 1,659,869 | Gow | Feb. 21, 1928 |
| 1,781,236 | Lilge | Nov. 11, 1930 |
| 1,789,542 | Caldwell | Jan. 20, 1931 |
| 1,963,009 | Wounsch | June 12, 1934 |
| 2,000,733 | Avery | May 7, 1935 |
| 2,042,034 | Wyman | May 26, 1936 |
| 2,117,270 | Bloom | May 17, 1938 |
| 2,126,417 | Sharp | Aug. 9, 1938 |
| 2,127,866 | Haase | Aug. 23, 1938 |
| 2,143,259 | Clarkson | Jan. 10, 1939 |
| 2,196,282 | Vooheis | Apr. 9, 1940 |
| 2,206,553 | Nagel | July 2, 1940 |
| 2,222,031 | Hammer | Nov. 19, 1940 |
| 2,222,822 | Nordensson | Nov. 26, 1940 |
| 2,334,314 | Campbell | Nov. 16, 1943 |
| 2,395,276 | Jordan | Feb. 19, 1946 |

FOREIGN PATENTS

| Number | Country | Date |
|---|---|---|
| 183,874 | Great Britain | Aug. 1, 1922 |
| 296,204 | Great Britain | Aug. 30, 1928 |
| 317,582 | Great Britain | Aug. 22, 1929 |
| 484,602 | Great Britain | May 9, 1938 |
| 633,525 | France | Oct. 24, 1927 |